(12) United States Patent
Seales et al.

(10) Patent No.: US 10,229,170 B2
(45) Date of Patent: Mar. 12, 2019

(54) FILE SYSTEM MANAGER FOR CUSTOMIZED RESOURCE ALLOCATION

(71) Applicant: DreamWorks Animation LLC, Glendale, CA (US)

(72) Inventors: Michael Christian Seales, La Crescenta, CA (US); Douglas E. Sherman, Glendale, CA (US)

(73) Assignee: DREAMWORKS ANIMATION L.L.C., Universal City, CA (US)

( * ) Notice: Subject to any disclaimer, the term of this patent is extended or adjusted under 35 U.S.C. 154(b) by 1066 days.

(21) Appl. No.: 13/802,488

(22) Filed: Mar. 13, 2013

(65) Prior Publication Data

US 2014/0280323 A1    Sep. 18, 2014

(51) Int. Cl.
*G06F 17/30* (2006.01)

(52) U.S. Cl.
CPC .. *G06F 17/30545* (2013.01); *G06F 17/30129* (2013.01)

(58) Field of Classification Search
None
See application file for complete search history.

(56) References Cited

U.S. PATENT DOCUMENTS

| | | | |
|---|---|---|---|
| 6,714,986 B2 | 3/2004 | Karibe et al. |
| 7,325,017 B2 | 1/2008 | Tormasov et al. |
| 8,099,420 B2 | 1/2012 | Farber et al. |
| 8,234,372 B2 | 7/2012 | Knapp et al. |
| 8,255,675 B1 | 8/2012 | Kaiser et al. |
| 2001/0044807 A1 | 11/2001 | Kleiman et al. |
| 2011/0179109 A1 | 7/2011 | Golbourn et al. |
| 2011/0252420 A1* | 10/2011 | Tung .................... G06F 9/5072 718/1 |

(Continued)

FOREIGN PATENT DOCUMENTS

EP    1983452 A1    10/2008

OTHER PUBLICATIONS

Buyya et al., "Cloud Computing and Emerging IT Platforms: Vision, Hype, and Reality for Delivering Computing as the 5th Utility", Dec. 11, 2008, Elsevier B.V.*

(Continued)

*Primary Examiner* — Mohsen Almani
(74) *Attorney, Agent, or Firm* — Dentons US LLP

(57) ABSTRACT

Systems and processes provide network clients on various platforms a customized file system experience on demand while managing files (e.g., computer animation files) across a variety of storage devices spread across a network of arbitrary size (local area networks, wide area networks, worldwide networks, the world wide web, etc.). Clients may specify a set of requirements for an instantiation of a file system interface or object for a given application. Such requirements may include storage location, file quality, capacity, scale, permanence, speed, and the like. The system may then provide to the client a customized file system interface with particular hardware resources allocated to satisfy the designated file system requirements. The file system interface may coordinate file delivery, allocation, tracking, transportation, caching, deletion, and the like. The system may manage and allocate hardware resources ranging from a local client computer to distant hard drive banks across the world.

27 Claims, 8 Drawing Sheets

(56) References Cited

U.S. PATENT DOCUMENTS

2013/0268575 A1* 10/2013 Xu ............................... 709/202

OTHER PUBLICATIONS

Sakr et al., "A Survey of Large Scale Data Management Approaches in Cloud Environments", IEEE Communications Surveys & Tutorials, vol. 13, No. 3, Third Quarter 2011.*
Buyya et al., "InterCloud: Utility-Oriented Federation of Cloud Computing Environments for Scaling of Application Services", Springer-Verlag Berlin Heidelberg 2010.*
Extended European Search Report received for European Patent Application No. 14159388.9, dated Jun. 25, 2014, 6 pages.

* cited by examiner

FILE SYSTEM MANAGER FOR CUSTOMIZED RESOURCE ALLOCATION

BACKGROUND

1. Field

This application relates generally to file systems and, more specifically, to computer systems and processes for managing files, such as computer animation files, across a wide area network and a variety of platforms.

2. Related Art

Companies are expanding internationally, relying on collaboration that spans the globe, and storing digital data in remote data centers (e.g., in the cloud). In some cases, companies are reaching the capacity of on-site storage and processing resources, and are turning to off-site cloud solutions as an alternative to adding on-site hardware that would occupy valuable real estate and potentially require major architectural modifications (e.g., cooling systems). This global expansion and reliance on off-site storage has introduced new challenges to file system management. For example, local area networks can typically transfer large amounts of data with nominal delay, but transferring data across a wide area network from one location in one state to another location in another state or across an ocean can lead to significant delays and lost productivity. Moreover, new global partners may utilize different operating and file systems, potentially introducing platform incompatibility. New data centers may likewise present incompatibility problems with existing file systems, thereby requiring costly software changes and limiting the flexibility of data storage and processing resources.

Additionally, despite the differing data storage needs of different employees, companies may be constrained to a single set of hardware resources (e.g., network storage devices) that may be excessive for the needs of some while insufficient for others. For example, employees working with large files, such as computer animation images or videos, may benefit from local storage that can be accessed almost instantly, while administrative employees working with small files, such as textual documents, may find off-site storage more than adequate despite a slightly longer latency per byte of data. Moreover, cross-company collaboration may necessitate that virtually all employees be able to access the same data resources, but this may mean limiting data storage options to ensure compatibility. To address the differing needs of different employees around the world, companies may provide local storage solutions along with off-site storage and backup, but this separation and redundancy adds complexity—especially as typical file systems store and manage files based on a physical mount point such that moving a file changes the name and identity of the file. Accordingly, while adding a variety of file storage options can improve utility, it may also increase file system complexity and increase the likelihood of broken links and corrupt files. Companies sensitive to these problems may then prefer data storage resources that are actually a poor fit for the varied needs of employees.

In the field of computer generated imagery (CGI) in particular, computer animation files may be both sizable and numerous, making file system management especially challenging. In addition, computer animation is becoming more and more distributed to take advantage of worldwide human resources, and managing files across the world poses additional challenges to file system management. For example, film studios may distribute animation tasks across different teams working in various countries throughout the world. In some instances, those teams may need to access the same animation files as the various teams collaborate, and transferring massive and numerous files from country to country can be inefficient and time-consuming. Managing a distributed animation process can thus be difficult and inefficient without the appropriate hardware resources and file system structures.

Thus, a file system manager is desired that allows for customized storage resource allocation, decreases data access latency, provides cross-platform compatibility, and improves hardware resource flexibility.

SUMMARY

Systems and processes for managing digital files (e.g., computer generated imagery (CGI) animation files) in a computer network are described. A request for a file system object may be received from a requester. The file system object may provide an interface between the requester and hardware resources for processing animation files and completing file system tasks. File system object requirements may be determined based on the request. A customized file system object may be generated based on the determined file system object requirements. The customized file system object may include information identifying hardware resources allocated for the requester to use for processing animation files and completing file system tasks. The customized file system object may be provided to the requester.

A request for a file system object may include location, storage type, transfer speed, write speed, read speed, versioning policy, capacity, permanence, and quality. Generating a customized file system object may include allocating hardware resources for the requester to use for processing animation files and completing file system tasks based on the file system object requirements. A link, handle, mount point, hardware address, or Internet protocol address may be provided in the customized file system object for accessing the identified hardware resources.

A customized file system object, in response to a request to create a file, may cause a uniform resource identifier to be generated for the file, memory to be allocated for the file, the uniform resource identifier to be mapped to the allocated memory, and a file handle to be provided. In response to a request to retrieve a file, a customized file system object may cause memory to be allocated for a copy of the file, the requested file to be copied to the allocated memory, and a link to the copied file to be provided. The customized file system object may also cause a uniform resource identifier for the copy of the file to be generated and mapped to the allocated memory.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1:
FIG. 1 illustrates an exemplary computer-generated animation scene.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Various embodiments are described below relating to providing a customized file system experience to network clients on a variety of platforms while managing the files across a variety of storage devices spread across a network of arbitrary size (local area networks, wide area networks, worldwide networks, the world wide web, etc.). An exemplary system includes a variety of hardware resources serving a variety of clients. A customized file system object (e.g., a software module with instructions that may be executed on a computer processor) may provide an interface between a client and hardware resources specifically allocated to serve that client. For example, hardware resources may be used for processing animation files and completing file system tasks. Clients may request a customized file system object by specifying requirements, such as storage location, file quality, capacity, scale, permanence, speed, and the like, and an exemplary file system manager (e.g., a software module executing on a server) may provide a customized file system object with appropriate hardware resources allocated to achieve the requested customized file system experience. A customized file system object may include various software modules or virtual interfaces for handling file delivery, transport, caching, tracking, deletion, allocation, and the like. The exemplary file system manager may also implement policies of file duplication, transfer, and caching, for example, to improve file system performance and reduce data access latency. Because file system objects may be customized by the file system manager to use certain hardware resources through a level of abstraction, hardware resources may be modified as needed without modifying the client file system interface.

All files may be designated by a Uniform Resource Identifier (URI) that is path independent and immutable. The system may include a mapping object to correlate a file URI with a project name, user-designated filename, user identity, version, timestamp, location, combination of one or more file attributes, or the like. The system may manage storage devices ranging from the local client computer to distant hard drive banks across the world. The system may implement policies according to client file system requirements for file distribution across storage devices, automatic file duplication, automatic transportation, file back-up, and the like. The system may also implement policies for garbage collection, archiving, versioning, and file distribution based on likely needs of users in different locations around the world.

Beneficially, the systems and processes discussed herein may provide a layer of abstraction that improves a user experience by providing—on demand—a customized file system object that automatically utilizes storage resources as needed—wherever they may be located—to create the desired file system experience. Additionally, changes and upgrades to storage devices may not require modifications to the client interface, and adding support for additional client platforms may easily be done incrementally as desired without modifying the server implementation.

File system management supporting a distributed computer animation process can be particularly challenging for a variety of reasons, such as the massive size of computer animation files, the significant quantity of files involved in the computer animation process, the distribution of computer animation tasks across teams in different locations, and the like. As such, computer animation files and processes are referenced as an illustrative example of how the various embodiments herein may improve file system management, although one of ordinary skill in the art will readily recognize that the systems and processes may be used for a variety of applications.

FIG. 1 illustrates an exemplary computer-generated animation scene. Notably, the scene includes a significant amount of detail that may correspond to a significant amount of computation in rendering the scene (e.g., detailed facial expressions, fur, whiskers, lion's mane, etc.). In some instances, specially-configured computer hardware may be desirable to render the details in such a scene. Moreover, the detail included in such a scene may correspond to a significant amount of data storage space. As data storage of such magnitude may be nontrivial, storage may be distributed in various locations with various storage types. Additionally, to generate such complex scenes in making animated films, significant human resource hours may also be needed, and the tasks may be distributed to teams across the world. For these reasons and others, the various embodiments discussed herein may provide preferable resource allocations with efficient file system management that accommodates the varied needs of different users.

Figure 2:
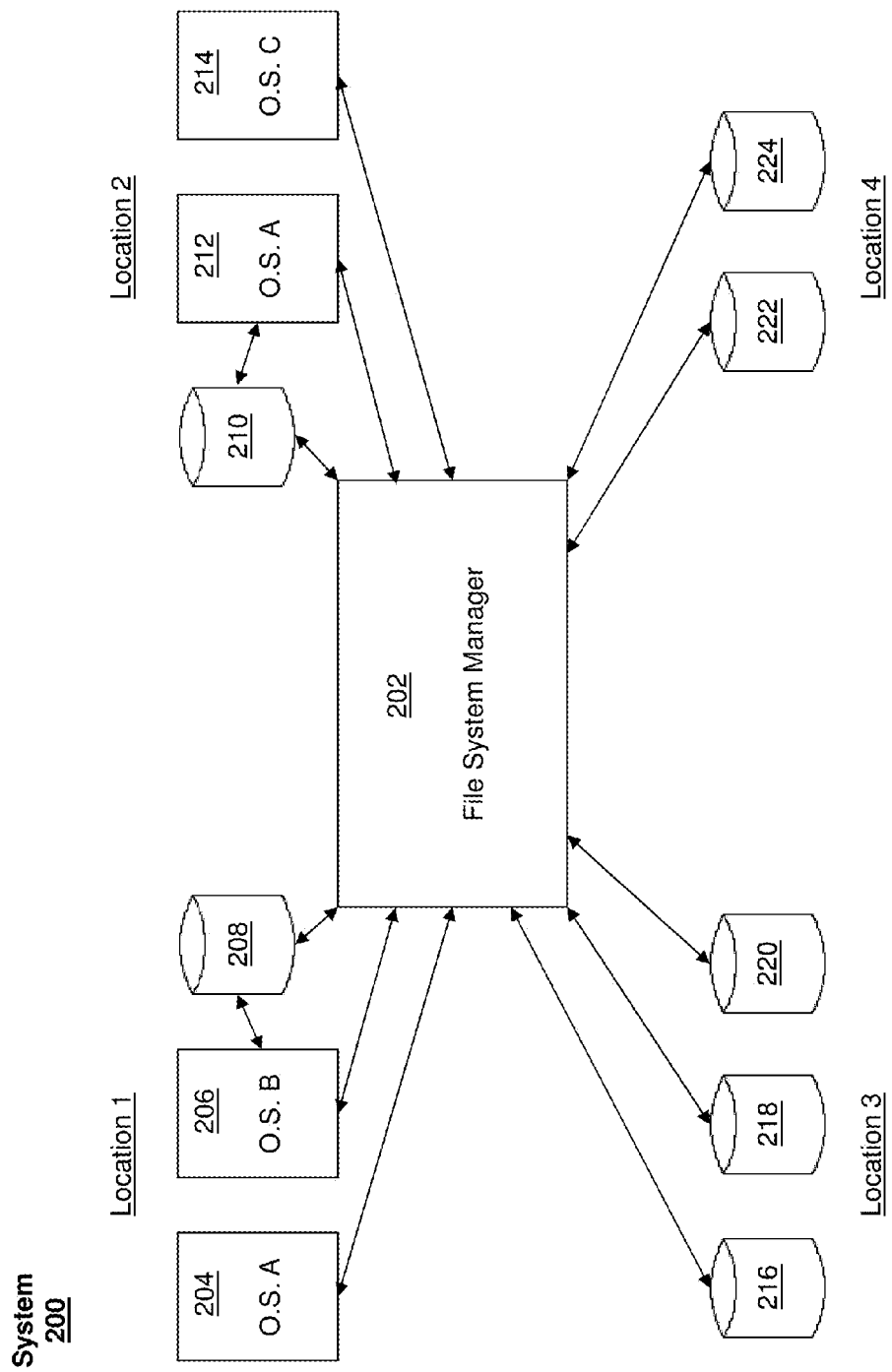
FIG. 2 illustrates an exemplary file system manager coordinating a variety of hardware resources in multiple locations.

FIG. 2 illustrates exemplary network system 200 with exemplary file system manager 202 coordinating a variety of hardware resources in multiple locations. In one embodiment, exemplary network system 200 may include hardware resources and clients at Locations 1-4. Locations 1-4 may be different locations within one office, different locations in a state, different locations spread throughout a country, different locations spread throughout the world, or any combination thereof. For example, Location 1 may be in one state, Location 2 may be in another state, Location 3 may be in another country, and Location 4 may be in yet another country. In one example, the network and resources may support a film studio producing animated films.

As illustrated, each location may have different hardware resources and may or may not have network clients. For example, Location 1 may include one or more network clients 204 and 206 along with one or more storage devices 208. Location 2 may include one or more network clients 212 and 214 along with one or more storage devices 210. Locations 3 and 4 may include storage devices 216, 218, 220, 222, and 224 and may or may not include any network clients. Network clients 204, 206, 212, and 214 may operate on one or more operating systems (e.g., Windows, Macintosh, UNIX, LINUX, etc.); for example, network clients 204 and 212 may operate on operating system (O.S.) A, network client 206 may operate on O.S. B, and network client 214 may operate on O.S. C. Network clients 204, 206, 212, and 214 may include any of a variety of computing devices, such as employee workstations, servers, laptop computers, mobile devices, phone systems, or any such devices that may deliver files to or request files from the network (e.g., the network including the various interconnected devices of network system 200 as well as at least one network server that is not shown but may be communicatively coupled to all network system components). In some instances, network clients may be used by animators, riggers, technical directors, producers, writers, and the like in producing animated films.

Moreover, storage devices 208, 210, 216, 218, 220, 222, and 224 may include any of a variety of storage devices, such as internal workstation hard drives, external network hard drives, flash memory drives, disk drives, tape drives, CD-ROMs, magneto optical drives, etc. In one embodiment, network system 200 may include a variety of storage devices that provide a variety of operational characteristics. For example, storage device 208 at Location 1 may be of a type and configuration to provide near-instant file transfer to network client 204 and/or network client 206 while storage device 216 at Location 3 may be of a type and configuration to provide lower-cost long-term storage for intermittent access at an increased delay for network clients. Similarly, storage devices 210, 218, 220, 222, and 224 may provide a variety of different network storage solutions with varied characteristics. Such characteristics may include file transfer latency, cost, capacity, interoperability, redundancy, and the like. In some instances, storage devices may be used to store digital files relating to producing animated films.

Additionally, storage devices 208, 210, 216, 218, 220, 222, and 224 may run on a variety of different operating systems and file systems. For example, some devices may implement disk file systems such as FAT12, FAT16, FAT32, exFAT, NTFS, HFS, HFS+, HPFS, UFS, ext2, ext3, ext4, btrfs, ISO 9660, Files-11, Veritas File System, VMFS, ZFS, ReiserFS, UDF, or the like.

File system manager 202 may include software executing on a processor, server, network computer, processor, or other computing device. Throughout this disclosure, software, software modules, software objects, and the like may be described as though they are performing particular functions for descriptive purposes. One of ordinary skill in the art, however, will appreciate that a processor or other hardware components of various computing devices may actually perform the functions, and the software may provide instructions causing the hardware components to perform those functions. File system manager 202 may be configured to work with any of a variety of storage devices running any of a variety of operating systems and file systems. In other words, file system manager 202 may be configured to address and handle any potential incompatibility issues between the operating system or file system of a network client and the operating system or file system of a storage device. File system manager 202 may handle incompatibility in any of a variety of ways, including providing file system objects (discussed below) to network clients that include modules, scripts, or interfaces that ensure cross-platform compatibility. In other embodiments, file system manager 202 may itself include software modules or interfaces allowing any network client to utilize any storage device for file system tasks regardless of the operating system or file system. One of ordinary skill in the art will recognize that incompatibility may be handled in any of a variety of ways to provide a user experience that is fitting for a particular implementation in a particular organization.

Because file system manager 202 may handle compatibility across a variety of platforms, new network client types and formats and new storage device types and formats may be easily integrated into an existing network without interrupting existing clients and devices. For example, integrating a new storage device and/or a new file format may only require adding a new module to file system manager 202 that provides file system objects with the requisite conversions and syntax to utilize the new device and/or file format. Similarly, providing access to a new network client type or format may only require adding support in file system manager 202 for that network client to request customized file system objects. Accordingly, because file system manager 202 coordinates network access across network system 200, new devices may be integrated easily and the system as a whole may be flexible as needs change, technology advances, etc. Moreover, because file system objects may be generated dynamically, file system manager 202 may immediately deploy new back-end storage device resources without requiring any changes from the requesting network devices.

File system manager 202 may coordinate the use of varied network storage devices by providing customized file system objects to network clients. Customized file system objects may provide an interface between requesting network clients and hardware resources allocated to those clients for particular operations (e.g., processing animation files, processing text documents, or completing other file system tasks). For example, network client 212 may need near-instant file transfer of large amounts of data while network client 214 may be satisfied with longer file transfer delays, and customized file system objects may be provided to each with hardware resources allocated to satisfy those needs. In some embodiments, file system manager 202 may dynamically provide customized file system objects at run-time such that network clients may enjoy a customized file system experience based on the real-time needs of current projects. The customized file system object provided to each network client may thus change over time or be customized differently for different projects running on the same network client computer. File system manager 202 may be a software program running on a server or on multiple servers connected to the network, and it may be located at any of Locations 1-4, at a different location, or at multiple locations. Network clients may communicate with file system manager 202 through any of a variety of means, including local area networks, wide area networks, the Internet, or the like.

In some embodiments, network clients 204, 206, 212, and 214 may be configured to automatically communicate with file system manager 202 to acquire a file system object for storing and retrieving network files (which may include local files as well as files stored on network storage devices) and other file system tasks. For example, some network clients may be configured to automatically request a customized file system object as part of the boot sequence of the operating system. File system manager 202 may then provide an appropriate file system object with appropriate hardware resources allocated for a particular file system experience. Files may then be retrieved from the network and stored on the network throughout the session by utilizing the file system object. In some cases, the file system object may be integrated into the operating system such that retrieving and storing files functions as though all files were local. In other cases, software interfaces may be provided and/or configured to provide access to network files using the file system object obtained at start-up. One of ordinary skill in the art will recognize that a variety of implementations are possible for utilizing a file system object throughout a user session to perform file system tasks.

In other embodiments, network clients 204, 206, 212, and 214 may be configured with software programs that communicate with file system manager 202 at run-time to obtain a file system object for storing and retrieving network files (which may include local files as well as network files). For example, some network clients may include software programs configured to request a file system object during initialization of the software or when certain commands are initiated, such as open, close, save, save as, new, etc. Software programs may include a configuration file (or "config" file) that allows network administrators to customize software to work with the network architecture in a particular way. Network administrators may include requesting a file system object from file system manager 202 as part of the configuration file. File commands, such as open, close, save, save as, new, and the like, may then be processed through the file system object provided by file system manager 202. When the software program is closed, the file system object may be discarded. New instances of the software program or new file system requests may involve obtaining new file system objects. In some cases, multiple file system objects may be obtained by a single network client for a variety of different file system tasks and/or a variety of different programs, and each file system object may be customized for the particular task, program, or use. For example, one file system object may be obtained for a document processing program, another file system object may be obtained for a spreadsheet program, another file system object may be obtained for a graphics design program, and yet another file system object may be obtained for an animation program. Each of these file system objects may be customized to provide an appropriate file system experience for the respective programs and/or tasks. Thus, multiple file system objects may be obtained dynamically as needed at run-time and discarded when they are no longer needed (or when they go out of scope).

In still other embodiments, any of network clients 204, 206, 212, and 214 may be configured to allow users to manually obtain file system objects to perform file system tasks. For example, users may communicate with file system manager 202 through a command prompt, a web browser, a file explorer or file system browser (e.g., Windows Explorer), or the like. Users may request a file system object, and file system manager 202 may provide a file system object, a link, or a handle to enable users to perform file system tasks through the file system object. One of ordinary skill in the art will recognize that a variety of implementations are possible and that any combination of configurations may be implemented for different network clients.

Figure 3:
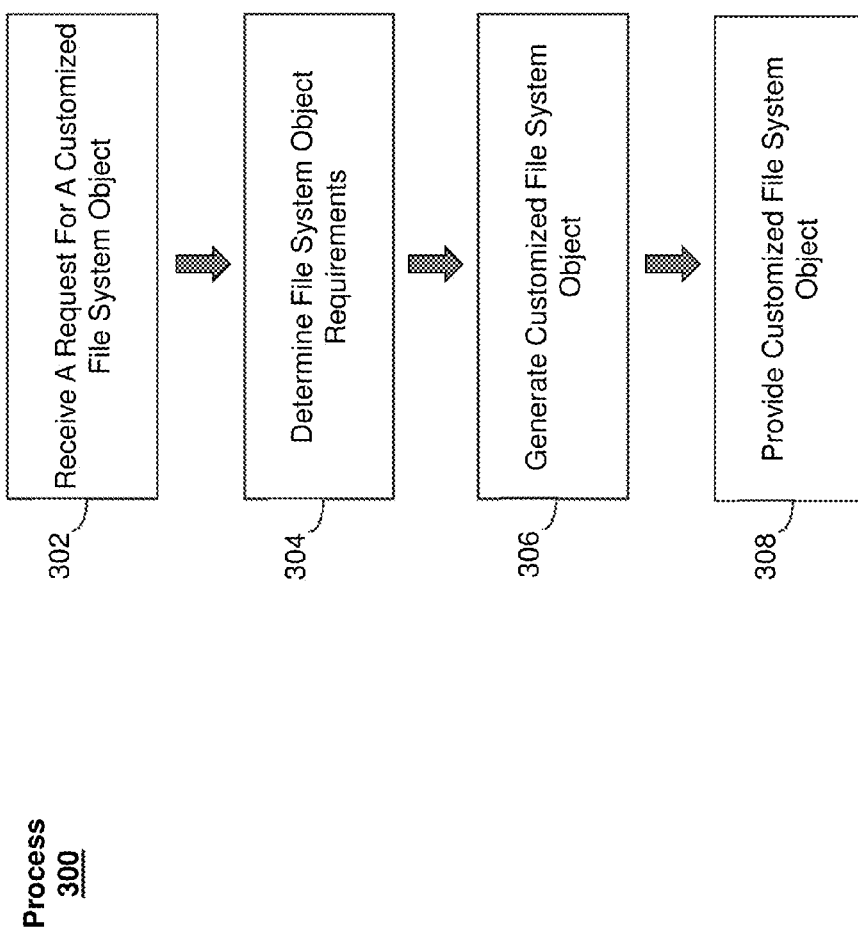
FIG. 3 illustrates an exemplary process for providing a customized file system object.

File system manager 202 of network system 200 may implement exemplary process 300 illustrated in FIG. 3 to provide a customized file system object to a network client. At block 302, file system manager 202 may receive a request from a network client for a customized file system object. The request may include a variety of file system requirements, preferences, network client characteristics, and the like. For example, the request may specify the needed storage type, the location, the preferred file transfer speed, file versioning policies to be implemented, write speed, read speed, and/or the storage capacity likely to be utilized. In other embodiments, various preferences and standards may be stored and substituted as needed, such as preferences of particular network clients, preferences of network clients at particular locations, preferences of similar network clients, previous network client requests, standard file system characteristics, or the like, when few or no particular characteristics are specified.

In yet another embodiment, the request at block 302 may include a location and a quality designation. For example, the request may designate low quality, medium quality, high quality, or the like, and file system manager 202 may associate these quality designations with particular hardware resource needs to provide the requested file system quality. One of ordinary skill in the art will recognize that the method of specifying file system requirements can be customized based on a particular organization and its needs. For example, an organization that produces animated films may implement file system quality designations, such as normal, high, playback, delivery, and the like. Animators, modelers, riggers, artists, technicians, and the like working on different stages of the film may be dealing with massive amounts of data, but the storage resources needed to process that data may vary based on an individual's role and/or the filmmaking stage or status. For example, an animator working on the flow of animation in a scene may access hundreds, thousands, or even hundreds of thousands of animation frames and/or animation data files. Such an animator—to work comfortably and efficiently—would thus require that the files be stored locally in devices with high-capacity and very low latency. The network client of such an animator may request a playback or high quality file system to communicate the need for rapidly accessing large amounts of data. In contrast, a modeler or rigger working on the clothing design for a single character in a single animation frame may be satisfied with a storage device with a longer latency for retrieving and storing the associated files. The network client for such a modeler or rigger may request a normal file system to communicate that typical file system resources are adequate. Thus, the particular needs of an organization may inform the manner of requesting customized file system objects, and the information included in a request for a customized file system object at block 302 may vary accordingly.

At block 304, file system manager 202 may determine file system object requirements. In one embodiment, file system object requirements may be determined by correlating any requirements specified in the request received at block 302 with available hardware resources to satisfy those requirements. For example, if a request at block 302 specifies a particular location and quality, file system manager 202 may determine at block 304 that an adequate file system object must include storage devices at that particular location with at least the designated quality. Similarly, if a request at block 302 specifies maximum file transfer latency and needed capacity, file system manager 202 may determine at block 304 that an adequate file system object must include storage devices with at most the specified file transfer latency and at least the specified needed capacity. Many variations are contemplated for file system manager 202 to determine particular requirements for a file system object from requirements specified in a request.

In other embodiments, file system object requirements may be determined by correlating the type of network client with typical hardware resource needs. For example, a typical employee workstation may require only a basic file system experience, so file system manager 202 may determine at block 304 that basic file system object requirements are sufficient given the requesting network client is a typical employee workstation. Contrastingly, in the example of an animation studio, a high-powered workstation used by animators may require a more advanced and responsive file system experience, so file system manager 202 may determine at block 304 that enhanced file system object requirements are necessary given the requesting network client is a high-powered workstation. In another embodiment, file system manager 202, at block 304, may determine file system object requirements based on the user of a requesting network client. For example, file system manager 202 may determine file system object requirements for an administrator processing textual documents that are different from file system object requirements for an animator processing hundreds or thousands of movie files.

In still other embodiments, file system object requirements may be determined at block 304 based on the type of program that is requesting a file system object. For example, file system manager 202 may determine file system object requirements for a word processing program that are different from file system object requirements for an animation program. In particular, basic file system object requirements may be sufficient for a word processing program while enhanced file system object requirements may be required for an animation program. In other embodiments, file system object requirements may be determined at block 304 based on any of a variety of other factors, such as the location of the requesting network client, the project priority of the user of the requesting network client, the type of file system tasks anticipated for a network client, previous file system objects generated for the requesting network client, and various other characteristics and criteria.

At block 306, file system manager 202 may generate a customized file system object by mapping hardware resources for a network client to use. An exemplary file system object is discussed in further detail below with regard to FIG. 5. In one embodiment, file system manager 202 may generate a customized file system object based on requirements determined at block 304. A customized file system object may be a computer program object or particular instance of a computer program class—including software instructions that may be executed on a processor to perform the functions described herein. As such, it may include a variety of attributes and behaviors including variables, functions, data structures, links, pointers, and the like to create a particular file system experience for a user. A customized file system object may be stored on a central server accessible to a requesting network client, or may be temporarily stored on one computer and copied to a network client or another computer as needed. A customized file system object may also be instantiated directly on a network client. In some embodiments, file system manager 202 may be distributed across network clients such that any file system manager tasks may be implemented on a network client, including generating a customized file system object.

Generating a customized file system object at block 306 may include providing necessary scripts or other software elements to allow a particular network client to communicate with one or more storage devices that may or may not be operating with the same file format or operating system. Similarly, generating a customized file system object at block 306 may also include providing links, handles, mount points, hardware addresses, Internet protocol addresses, and the like along with any other hardware resource information needed for a network client to utilize a hardware resource that may or may not be at a distant location. Generating a customized file system object at block 306 may further include applying an archiving policy, a file back-up policy, a versioning policy, or any of a variety of other file system policies. One of skill in the art will recognize that generating a customized file system object at block 306 may be customized for a particular organization with a particular network structure, set of hardware resources, variety of file formats, variety of operating systems, variety of file archiving needs, and the like.

File system manager 202 may generate a customized file system object at block 306 by instantiating a file system class with specified requirements or variables as arguments to obtain the desired attributes. In some instances, some file system object attributes may be unspecified or unimportant to a network client. File system manager 202 may automatically provide any missing attributes with predetermined attributes, attributes based on policies, attributes based on resource availability, or the like. For example, if a network client requests a file system object with high capacity but does not specify other attributes such as location or latency, file system manager 202 at block 306 may generate a customized file system object by selecting any of a variety of hardware resources that satisfy the request. Satisfactory file system objects in this example may include mapped hardware resources at a variety of locations with a variety of latencies, and file system manager 202 may select which hardware resources to map in any of a variety of ways such as selecting the lowest latency, the closest location, the cheapest storage costs, the highest available capacity, and the like. Because of this system flexibility, even identical requests for customized file system objects may yield different results (e.g., different hardware resource mappings) depending on the status of network resources. Beneficially, this flexibility may allow network administrators and file system manager 202 to dynamically map hardware resources for optimal utilization, optimal user experience, reduced storage costs, and the like.

In some instances, however, file system manager 202 may be unable to allocate resources to fully satisfy a request. For example, hardware with sufficient space, speed, or the like may be unavailable to meet the requirements specified. In those instances, file system manager 202 may reject the request, generate a default file system object, generate a file system object that satisfies as many of the requirements as possible, generate a file system object with the best resources available, or the like.

At block 308, file system manager 202 may provide the customized file system object generated at block 306 to the requesting network client. Providing the customized file system object may occur in a variety of ways depending on how the object was generated at block 306. In one embodiment, file system manager 202 may provide to the requesting network client a link to the customized file system object that may reside on a network server or any other computer. In another embodiment, file system manager 202 may provide a stand-alone software object with all the links, scripts, addresses, protocols, and the like needed to provide a file system experience for a network client. In yet another embodiment, a network client may be configured to function as though all file system operations are local, and file system manager 202 may provide instructions to the network client to direct storage operations to particular hardware resources. A network client may also be configured to duplicate local files onto the network, and file system manager 202 may provide instructions to the network client to direct duplication operations to particular hardware resources. In still another embodiment, file system manager 202 may provide, at block 308, a software object that functions as an intermediary between the existing file system of a network client and the file systems of various network resources.

Figure 4:
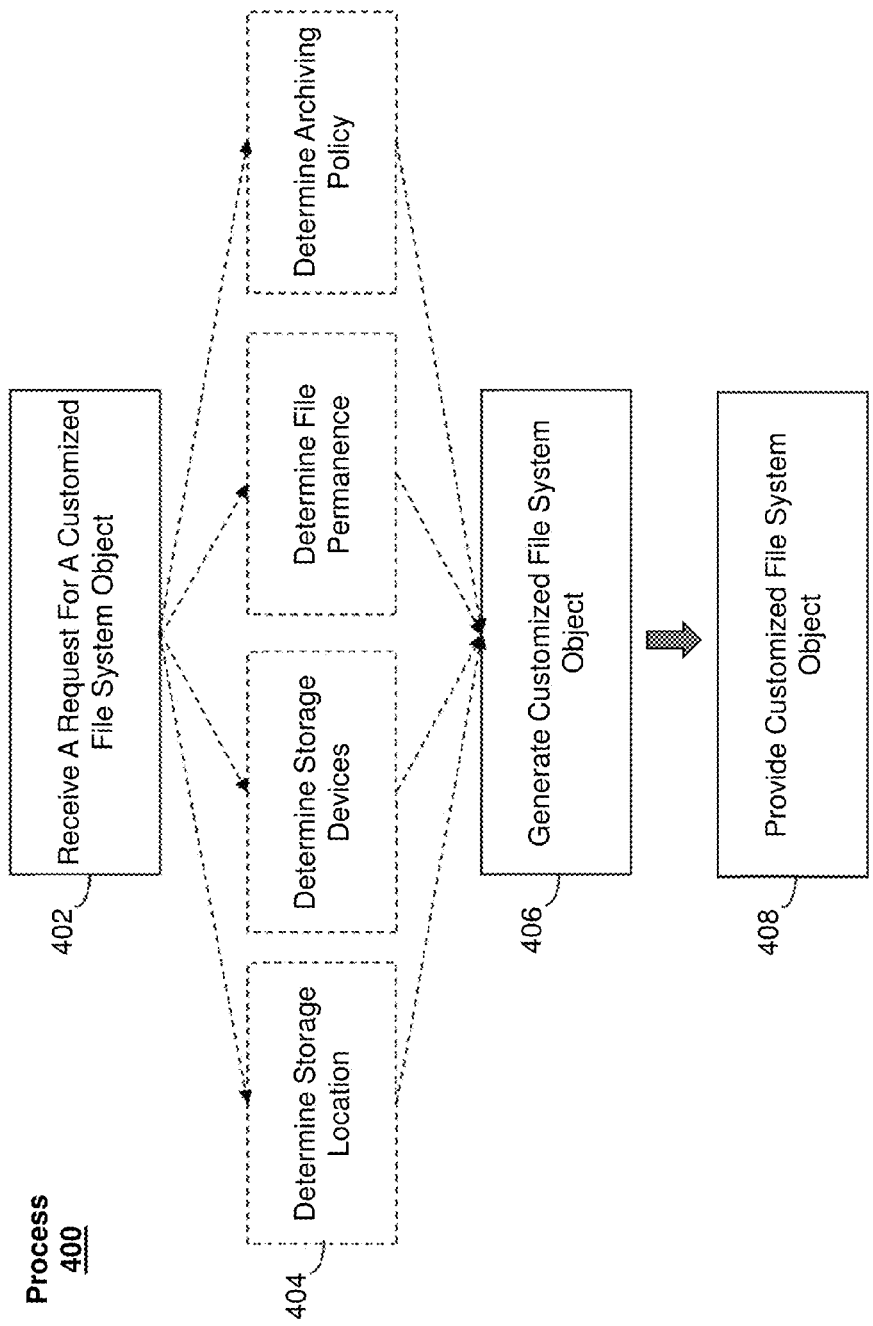
FIG. 4 illustrates an exemplary process for providing a customized file system object based on various resource needs.

FIG. 4 illustrates exemplary process 400 for providing a customized file system object to a network client with exemplary steps 404 for determining file system object requirements from various resource needs. At block 402, a file system manager may receive a request from a network client for a customized file system object. As discussed with regard to process 300, the request may include a variety of file system requirements, preferences, network client characteristics, and the like.

At blocks 404, the file system manager (or similar network software) may perform any number of functions to determine the hardware resource requirements and other attributes for the customized file system object requested at block 402. Several example operations are shown, but many others are possible to translate a request for a customized file system object into particular hardware resource needs. For example, the file system manager may determine a particular storage location, such as the location of the requesting network client or the location of an off-site, high capacity storage facility. The file system manager may also determine particular storage devices at a particular location, or may determine particular types of storage devices that satisfy the request at block 402. The file system manager may also determine file permanence, or the expected duration files may be stored using the customized file system object, and may determine hardware resources corresponding to file permanence or duration. The file system manager may also determine a particular archiving policy to apply to a customized file system object, such as archiving all file versions in separate files, archiving files daily, archiving all files permanently, archiving all files for a specified duration, or another archiving policy that may be based on file type or other characteristics. Thus, a file system manager may determine various file system attributes and corresponding resource needs as illustrated by blocks 404.

At block 406, the file system manager may generate a customized file system object that includes the attributes and corresponding resources determined at blocks 404. At block 408, the file system manager may provide the customized file system object generated at block 406 to the requesting network client.

Figure 5:
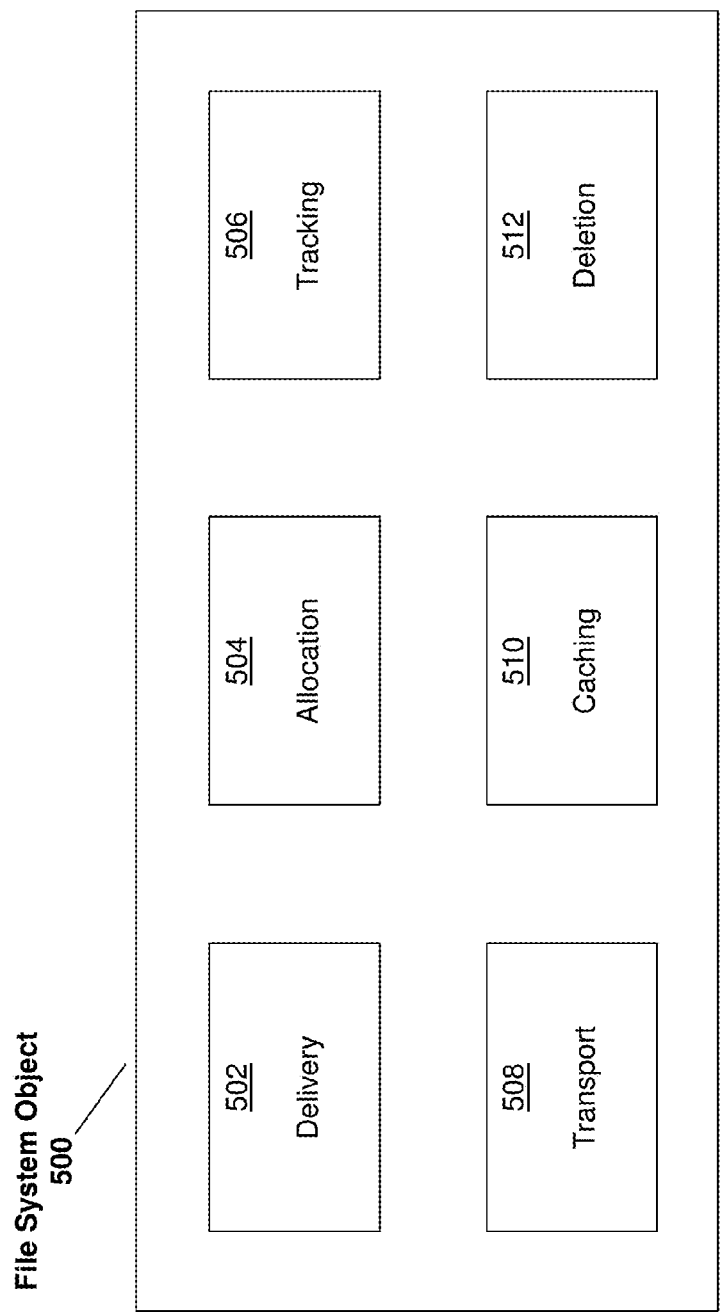
FIG. 5 illustrates an exemplary file system object.

FIG. 5 illustrates an exemplary file system object 500 that may be generated by process 300 or process 400 discussed above. It should be noted that file system object 500 may be an interface that operates to utilize traditional file systems. For example, file system object 500 may communicate with a native file system on a network client, a file system on a network storage device, a file system at a remote storage location, or the like in order to provide a file system experience to a user. In other words, file system object 500 may appear to a user and/or network client to be a typical file system; in reality, however, file system object 500 may be software that provides a file system interface to a network client and/or user while coordinating file system tasks of one or more traditional file systems. As such, a network client may be provided with software that maps typical file system requests to functions of customized file system objects.

In one embodiment, file system object 500 may include multiple software modules for providing a file system interface and coordinating various file system tasks (including, for example, processing animation files). As illustrated in FIG. 5, file system object 500 may include delivery module 502, allocation module 504, tracking module 506, transport module 508, caching module 510, and deletion module 512. Delivery module 502 may coordinate reading and writing files. Delivery module 502 may be configured to read data from and write data to a variety of storage locations, such as the local disk, a network device, the Internet, or the like. Delivery module 502 may be configured with the necessary links, addresses, protocols, scripts, and the like for accessing files on a variety of file systems.

Allocation module 504 may coordinate where and how files are created. For example, allocation module 504 may be configured to specify the kinds of files used by a file system object, where those files may be stored, the types of file systems to be used, the storage space to be allocated in various storage devices, and the like. Tracking module 506 may track what files exist that can be accessed and/or manipulated. Tracking module 506 may be configured to communicate with other network programs that may track all files across a network system. In one embodiment, tracking module 506 may be configured to communicate with a file system manager or project manager that maintains a listing of some or all network files. Tracking module 506 may allow a user to locate and access existing files from anywhere on the network, and may allow a user's newly created files to be added to network file listings. In some embodiments, a network system may have a project management system that organizes network files by project and project contributors. Files may be correlated with a particular working project, and tracking module 506 may coordinate tracking of these project files directly or may communicate with other network system software that tracks project files.

Transport module 508 may coordinate moving and/or copying files from one storage device or location to another. For example, when a user will be manipulating files locally that are stored remotely, transport module 508 may coordinate moving or copying those files between the remote storage and local storage to enable faster response times for a user. In particular, transport module 508 may cause remotely-stored files to be copied or moved into local storage to reduce file access latency. In some embodiments, transport module 508 may be configured to maintain duplicates of local files in a remote storage device or location. In other embodiments, transport module 508 may be configured to move files automatically from one storage device or location to another based on user access requests, expected user needs, system status, available storage space, or similar factors.

Caching module 510 may coordinate scaling and acceleration of file delivery. For example, when large files or large quantities of files are requested, caching module 510 may coordinate network resources to accelerate file delivery and improve file transfer performance. In one embodiment, caching module 510 may be configured to request files in batches or request portions of files in parallel to reduce the transfer time from remote storage to local storage or between any storage devices. Caching module 510 may also coordinate with a file system manager, network monitor, or other network software to prioritize file transfers at optimal times. For example, if large quantities of files are to be transferred from a first country to a second country for the second country's working hours, and then back again later for the first country's working hours, caching module 510 may coordinate file transfer scheduling when network traffic is low, when few files are transferred across particular network lines, or at other optimal times for mass data transfer across large distances. In some embodiments, caching module 510 may also be configured to transfer files from location to location in a chain of multiple locations to minimize network resource disruption or to take advantage of periods of low network traffic. Similarly, caching module 510 may cache portions or all of the files being transferred in a variety of storage devices as needed to improve file transfer performance.

Deletion module 512 may coordinate deletion of files, copies of files, cached portions of files, and the like. In some embodiments, deletion module 512 may communicate with garbage collection network software to mark a file as deleted and/or raise a file's priority for deletion. In another embodiment, deletion module 512 may set a date and/or a time when a file may be deleted by a garbage collector or other system resource. Deletion module 512 may select such a date based on the type of network client, the type of files a user may be working with, file retention policies, file access frequency, the time passed since the most recent file access request, or the like. In still other embodiments, deletion module 512 may be null when a file system manager determines that a user of a particular file system object and/or a particular network client should not be permitted to delete files. This restriction may be useful where organizations prefer to retain all employee work product to track versions, store backups, and/or enable easily reverting back to earlier versions of particular project files.

Figure 7:
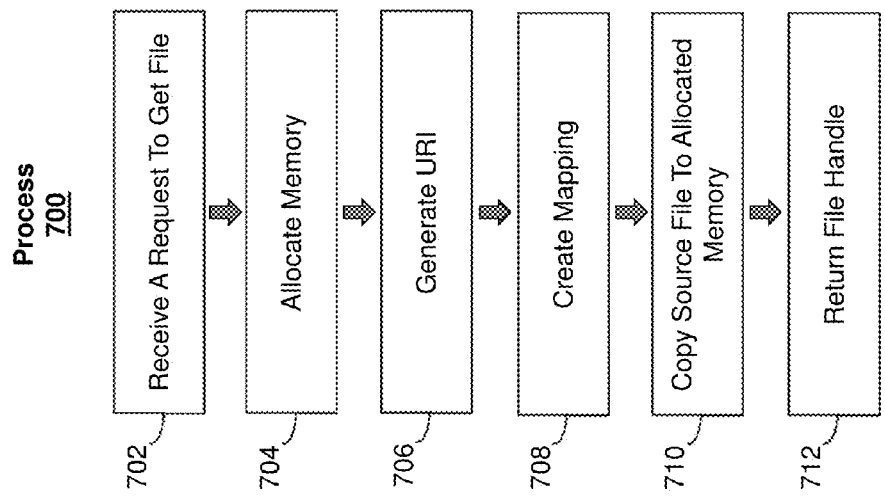
FIG. 7 illustrates an exemplary file system object process for retrieving a file.
Figure 6:
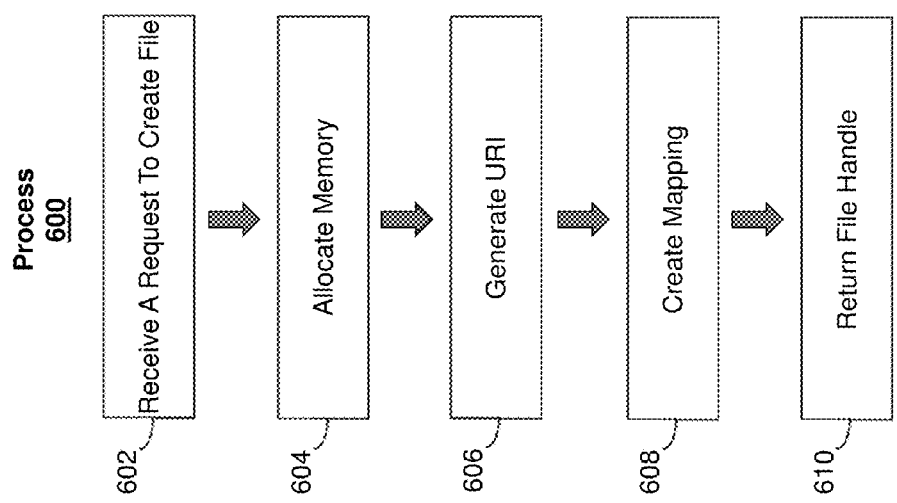
FIG. 6 illustrates an exemplary file system object process for creating a file.

FIG. 6 and FIG. 7 illustrate exemplary processes carried out by a file system object or interface alone or in conjunction with a file system manager and other network resources. As noted above, while software objects or modules are described herein as performing various functions for descriptive purposes, it will be appreciated by one of ordinary skill in the art that the software may typically provide instructions that may be executed on a computer processor to cause the functions to be performed. A file system object may be used to perform and/or coordinate any number of file system tasks. For example, create a new file, ingest a file, clone a file, retrieve a file, write to a file, read from a file, edit a file, commit a file, retrieve a file for edit, copy a file, create a new version of a file, and the like. FIG. 6, for example, illustrates exemplary process 600 for creating a file. At block 602, a file system object may receive a request to create a file. The request may come from a user, from a program running on a network client, from a system resource, or the like. In one embodiment, the request may include the particular type of file to be created. In another embodiment, a file system object receiving the request may be associated with only one program or one file type making additional details unnecessary. The request may also include any of a variety of additional instructions or details such as when to create the file, where to create the file, where the file will be used, the permanence of the file, the name of the file, or the like. In one embodiment, the request may also specify the number of files to be created such as when multiple files of the same type and requirements are needed and may be processed as a batch. In some embodiments, default file creation details may be used unless overridden with specific requests.

At block 604, the file system object may allocate sufficient memory for the file to be created. The amount and location or locations of memory to be allocated may depend on the request from block 602, system status, default requirements, associations with a particular program, or the like. In one embodiment, only local memory in the network client may be allocated. In another embodiment, only remote storage memory may be allocated. In yet another embodiment, memory may be allocated in multiple storage devices locally and/or remotely. The file system object may allocate memory at block 604 by issuing the appropriate commands to a local file system on the network client, to a network storage resource, to a network storage device, to an Internet server, to the file system manager, or the like. Upon allocating memory, the file system object may or may not receive back a file handle or address for accessing the allocated memory. In some embodiments, a separate network resource may coordinate file access, and that resource may store the allocated memory address and correlate it to a particular project or file name.

With memory allocated for a new file, the file system object may cause a URI to be generated at block 606. A URI may be a system-generated key that is unique to the newly created file, is immutable once created, and is not necessarily tied to a particular file address. For example, a URI may be a unique string of alphanumeric characters. The URI may be recognized by network software as corresponding to one or more memory addresses that hold a copy of the corresponding file. Beneficially, a URI need not be associated with a particular mount location (such as a particular address or file system). As such, the corresponding file may be renamed, moved across devices, copied to multiple locations, maintained on different file systems, and the like without changing the URI. Rather, network software such as a project manager may maintain a mapping or table that correlates each URI with the one or more locations where the corresponding file is located/physically stored in memory. In one embodiment, maintaining multiple URIs may function like a content addressable file system in that a particular key corresponds to a particular file.

In addition, a project manager or similar system resource may maintain a mapping or table that correlates particular file characteristics with a particular URI. For example, a particular URI may correspond to a particular textual filename created by a particular user of a particular version of a file with a particular provenance (associated parent files). Accordingly, a user may interact with a file based on typical characteristics known to the user (filename, version, etc.) while the system correlates those characteristics with a URI, which is also correlated to one or more memory addresses. Beneficially, the user can modify the filename, move the file across different network clients and file systems, and the like without changing the URI. In contrast, moving a file from one device to another device typically changes the filename, which may cause files to be lost and links to files to become broken. By using a URI, a layer of abstraction is provided that ensures consistency and improves accessibility of files across varied network resources as correlations are simplified and centrally maintained.

With a URI and allocated memory, the file system object may create a mapping at block 608 between the generated URI and the allocated memory. In some embodiments, this process may occur automatically and may be handled by network software as memory is allocated and URIs are generated. In other embodiments, the file system object may communicate memory addresses and corresponding URIs to a project manager or similar network resource for it to maintain the correlations. As part of the mapping, the file system object may also begin to populate file characteristics corresponding to the particular URI, such as filename, user, version, provenance, and the like. In some embodiments, the file system object may communicate these characteristics to a project manager or similar network resource for it to maintain this data in a table or mapping.

At block 610, the file system object may cause a file handle to be returned to a requesting network client or user. The file handle may be a particular memory address available to the network client for accessing the newly created file. The file handle may be a local memory address, and in some embodiments, the file system object may cause the contents of that local memory address to be stored remotely. In other embodiments, the file handle may be any of a variety of links that a network client may use to access the newly created file. In some embodiments, a system manager may generate the file handle and return it to the network client. In other embodiments, a network client and/or user may not have access to a particular file handle, but instead may access the file through the file system object by referencing a particular filename or other characteristic.

FIG. 7 illustrates exemplary process 700 for retrieving a file. At block 702, a file system object may receive a request to get a file. The request may come from a user, from a program, from a system resource, or the like. As discussed above with regard to process 600, the request may or may not include a variety of additional details such as the number of files to retrieve, the types of files, file handling instructions, locations for storing the files, and the like. The request may include any of a variety of identifiers for indicating which file or files to retrieve. For example, a request may include a filename, and the file system object may correlate the filename with a particular URI by querying a system resource such as a project manager. The URI may then be used to access the resource through the network, or a network resource such as a project manager may be queried to identify the location or locations where the corresponding file is located. A request may also include a URI directly, in which case the file system object may either access the file by querying a network resource for a location or requesting that the network provide the file directly. A request may also identify a user, a file version, a date, provenance, file size, file type, or any of a variety of file characteristics and combinations of file characteristics that the file system object may use to identify a particular file for retrieval.

At block 704, the file system object may cause memory to be allocated for the file. In one embodiment, the file system object may allocate local memory to receive a copy of the file. In other embodiments, the file system object may cause memory to be allocated remotely to receive a copy of the file. In some embodiments, some or all users may not be permitted to edit existing network files or committed network files. In those instances, rather than editing existing network files, the file system object may cause a new copy of the file to be generated for a user to edit without modifying the source file. This functionality is particularly useful when organizations prefer to save employee work product for backup and to enable easily reverting back to prior versions. For example, an organization that produces animated films may implement a policy of never saving over or editing earlier versions of animation frames. In some cases, files may be committed to designate that they are not to be modified by any user again, and rather than overwriting committed files, new versions may automatically be generated. As such, when an animator, modeler, rigger, artist, technician, or the like desires to edit an animation frame or scene that has been saved or committed (depending on the reach of the policy), a file system object or other system resource may cause a new copy with a new version number to be generated that can then be modified while leaving the source file intact. Beneficially, as frames and scenes are combined, earlier frame and scene versions may easily be accessed and used as desired instead of later versions.

At block 706, the file system object may cause a URI to be generated in a similar way as described with regard to block 606 of process 600. In some embodiments, no new URI may be generated where a user is accessing a file read-only or when a user is able to edit a file directly. In other embodiments, a new URI must be generated for a new copy of the file that a user is permitted to edit. In still other embodiments, multiple new URIs may be required where multiple files are requested and multiple new file copies are generated.

At block 708, the file system object may create a mapping between the generated URI, if any, and allocated memory. In some embodiments, this process may occur automatically and may be handled by the network system. In other embodiments, the file system object may communicate memory addresses, corresponding URIs, and/or file characteristics to a system resource to enable it to maintain a table or mapping of files. In some embodiments, the file system object may cause the characteristics of the requested file to be copied into the network system's mapping resource (such as a project manager), modifying those characteristics that may have changed with the newly generated copy of the file.

At block 710, the file system object may cause the requested source file to be copied into allocated memory (which may be multiple copies in multiple locations or multiple locations for a single copy). The file system object may issue the copying commands directly to the relevant underlying file systems where the file resides and where the file is to be copied, it may direct a file system manager or other system resource to perform the copying, or it may interface with other network resources to cause them to generate one or more copies as needed.

At block 712, the file system object may cause a file handle of one or more of the copied files to be returned to a requesting network client or user. The file handle may be a memory address, a link, or any other instruction allowing the network client to access the file that a user may then be able to read or edit. In some embodiments, the file handle may correspond to a local copy of the file, and the file system object or other system resource may cause the local copy to be automatically copied and stored on a network storage device.

One of ordinary skill in the art will recognize that processes 600 and 700 may readily be modified based on a particular network setup, desired policies, preferences, and the like. In addition, not all listed functions need to be performed, and many variants are possible. Moreover, a file system object may coordinate a variety of other processes in creating a file system experience for a user. For example, process 600 or 700 may be modified to accomplish other functions such as ingesting a file, cloning a file, retrieving a file, writing to a file, reading from a file, editing a file, committing a file, copying a file, creating a new version of a file and the like. Committing a file may include, for example, modifying the profile of a file to indicate that it has been committed, and can no longer be edited or altered by any user. Creating a new version of a file may include, for example, generating a new copy of an existing file while indicating in the profile of the new file that it is a new version and descended from the prior version (this relationship may also be referred to as the file's provenance). Other functions are possible as well, and one of ordinary skill in the art would readily recognize the requisite steps needed to execute those functions in a particular system.

Figure 8:
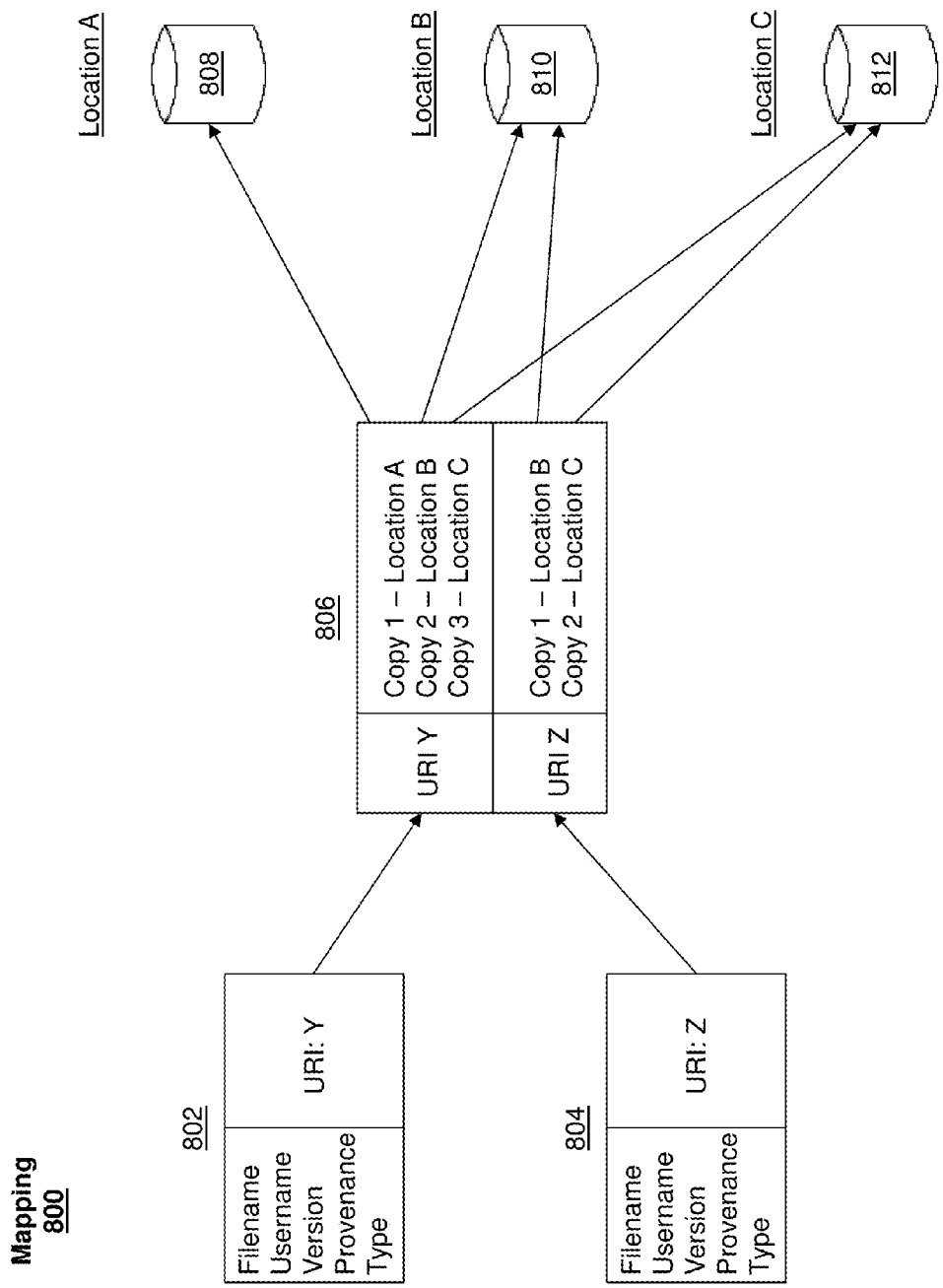
FIG. 8 illustrates an exemplary file mapping with multiple file copies in multiple locations.

FIG. 8 illustrates exemplary file mapping 800 with multiple file copies in multiple locations. As mentioned above, one or more network resources may maintain a mapping of file characteristics, URIs, and storage locations. At block 802, for example, a table or mapping is illustrated of an exemplary file profile with its associated URI Y. As illustrated, a file profile may include a variety of file characteristics including filename, username, version, provenance, type, and the like. Provenance (or derivation) may include a listing of some or all related files and their relationship such as parent files or versions, sibling files or versions, grandparent files or versions, source files, form files, and the like. Additional characteristics may also be included in a file profile such as a timestamp, date created, date last modified, location where it was last accessed, file size, access frequency, number of users accessing the file, number of edits, and the like. A user or network client may identify a file by one or more of the characteristics in the file profile, and a system resource may then correlate the one or more characteristics with a particular URI, such as Y at block 802. Similarly, URI Z at block 804 is illustrated as corresponding to a different file with a different file profile.

Block 806 illustrates a table or mapping correlating a particular URI with the one or more locations where the corresponding file is located. Although block 806 is illustrated separately from blocks 802 and 804, in some embodiments they may all be combined and maintained by a single project manager or similar network file manager. Exemplary URI Y is illustrated as having a copy of the associated file at Location A on storage device 808, at Location B on storage device 810, and at Location C on storage device 812. In one embodiment, each of the copies may be identical and may be located at multiple locations to provide faster access to users nearer those locations. Should a copy be modified, the other copies may be updated to match the modified copy, the other copies may be deleted as being stale, and/or new copies may be generated from the updated copy. In another embodiment, a file may be divided across multiple storage devices. Similar to URI Y, exemplary URI Z is illustrated as having a copy at Location B on storage device 810 and at Location C on storage device 812.

As illustrated, different URIs may have different numbers of copies in different locations depending on user needs, system policies, system resources, and the like. Beneficially, because a correlation or mapping is maintained with immutable URIs, a file's profile may change and its storage location or locations may change without modifying the corresponding URI. This preserves links to files and improves reliability of file access across devices with different operating systems and/or file systems. For example, even if the file corresponding to URI Z was moved to Location A and deleted from Location B and Location C, a user or network client requesting the file corresponding to URI Z would still be able to access the file with the same information despite the changed location as mapping or table 806 would have been updated to reflect the change. Similarly, even if the filename, version, or username is changed for the file corresponding to URI Y, a user or network client requesting the file corresponding to URI Y would still be able to access the file as long as the correct URI is provided as found in tables or mappings 802 and 804. Mapping 800 thus illustrates one example of how a file system may manage and map various file resources and correlate them to immutable URIs, although many possible variants would be readily identified by one of ordinary skill in the art.

A file system manager, project manager, file system object, or other network program may be customized to implement a variety of policies in addition to those discussed above. For example, a file system manager may implement a policy of automatically archiving older files that have not been accessed recently. In one embodiment, a network program such as a garbage collector may implement an archiving and deletion policy by requesting a file system object from the file system manager and using the file system object interface to move older files into cheaper, more distant storage locations. When files have reached a particular age or are marked for deletion, the garbage collector may then cause the files to be deleted entirely or moved to a special archive like a tape drive. The garbage collector may also cause extra copies of older files to be deleted to free up space and limit duplicates of infrequently accessed files. The file system manager may provide the garbage collector with a file system object that has greater permissions than those file system objects provided to typical network clients. For example, a file system object provided to the garbage collector may include a deletion module that allows the garbage collector to permanently delete files from storage while typical network clients may not be allowed to do so.

Another network program for implementing network policies may include a system resource monitor. The system resource monitor may request a file system object from the file system manager to then use the file system object interface to move files across different hardware resources as needed. For example, if a particular storage device is reaching capacity, the system resource monitor may cause infrequently accessed files to be moved from that device to a different storage device in another location. As discussed above, the URIs for moved files will remain the same, but the file system object will cause the system's URI mapping to be updated to reflect the new location of the moved files.

Similarly, the same or another network program may implement a policy (using a file system object interface) to reduce file access latency for network clients. For example, a team of collaborators known to be working on the same project may be spread across the world in multiple countries. A system program may cause files related to the team's project to be moved or copied automatically to the various locations. For example, the system program, using a file system object interface as described above, may automatically copy edited files relating to the common project from a storage device in a first country to a storage device in a second country, and later to a storage device in a third country, to ensure those files are readily accessible with minimal delay during normal working hours of those countries. Any new or edited files may then, of course, be copied or moved to the first country in anticipation of the normal working hours of collaborators located there. In some embodiments, only edited portions of a file may be moved or copied to bring an existing remote copy up to date. Such preemptive policies may be particularly important when the quantity and size of collaborator files increase access times such that it inhibits employee productivity. For example, an organization producing animated films may have collaborators across the globe working on hundreds of thousands of massive animation files, and moving those files across the world may take minutes or even hours instead of seconds. Accordingly, duplicating or moving files preemptively may dramatically improve productivity for collaborators.

Other file duplication or moving policies may be implemented based on the needs of an organization. For example, files relating to a time-sensitive or otherwise important project may be automatically copied to various locations for quick access. Newly created files may similarly be automatically copied to various locations anticipating other users may require access or may edit the same files. In one embodiment, file access requests may be monitored, and files may be transferred preemptively according to identified trends. Thus, a variety of policies may be implemented by file system objects, or network programs using a file system object interface, to reduce file access times and improve file system performance generally.

In some embodiments, file access restrictions may be implemented to limit which users and/or which network clients may access particular files. In one embodiment, all files may be accessible to all users. In another embodiment, however, file access may be restricted by controlling service calls to the file system. For example, a file system object requesting from a project manager the mapping between a file, a URI, and one or more storage locations may be denied that information if the requester does not have appropriate authorization. Without the mapping, the file system object will be unable to find and access a file, thus protecting its contents from unprivileged users. Privilege or authorization may be granted on a user-by-user basis, to all users working on a particular project, to users in a particular location, to users with a particular position, to users with a particular seniority, or the like. Users may still be able to access any files stored locally on their computer, but any file access requiring a query to the file system for a file mapping may thus be regulated to restrict access.

In another embodiment, all files may be encrypted, thereby requiring a key to decrypt the contents of a file. For example, a file system may implement encryption for all saved files and may maintain a database of keys needed to decrypt the encrypted contents. Just as above with regard to file mapping access permission, the file system may limit which users have access to particular keys, thereby limiting who can access file contents. Beneficially, file mappings and some file profile information may be accessible to all users without a key; thereby enabling users to appreciate what files may be available whether or not they have adequate access permissions to view the file contents. As such, if a user identifies a desired file but does not have permission to obtain the decryption key, that user may request access from the owner of the file, from a system administrator, from the file's author, or the like and be granted specific access permission to obtain the requisite decryption key. Additionally, because stored files are encrypted, users may be able to view files stored locally on their computer, but they may be unable to decrypt file contents without sufficient permission to obtain the decryption key. Accordingly, file access may be regulated and valuable information protected, regardless of where it is stored, by encrypting files and restricting access to decryption keys.

The systems and processes described herein for managing a file system and providing customized resource allocation may be implemented in a wide variety of applications. For example, the file system manager and file system objects may replace virtually any existing network file system of any organization. Such a system may be particularly useful, for example, where different users with different tasks have different file system needs, and hardware resources may be allocated in a customized way to address varying needs and improve file system performance. Similarly, where the size, quantity, and distribution of files are so large as to introduce significant file transfer delays, the systems and processes described herein may improve the file system experience of users and better allocate hardware resources. Existing commercial asset management systems may also be replaced or improved by introducing the customizability provided by the various embodiments described herein.

Figure 9:
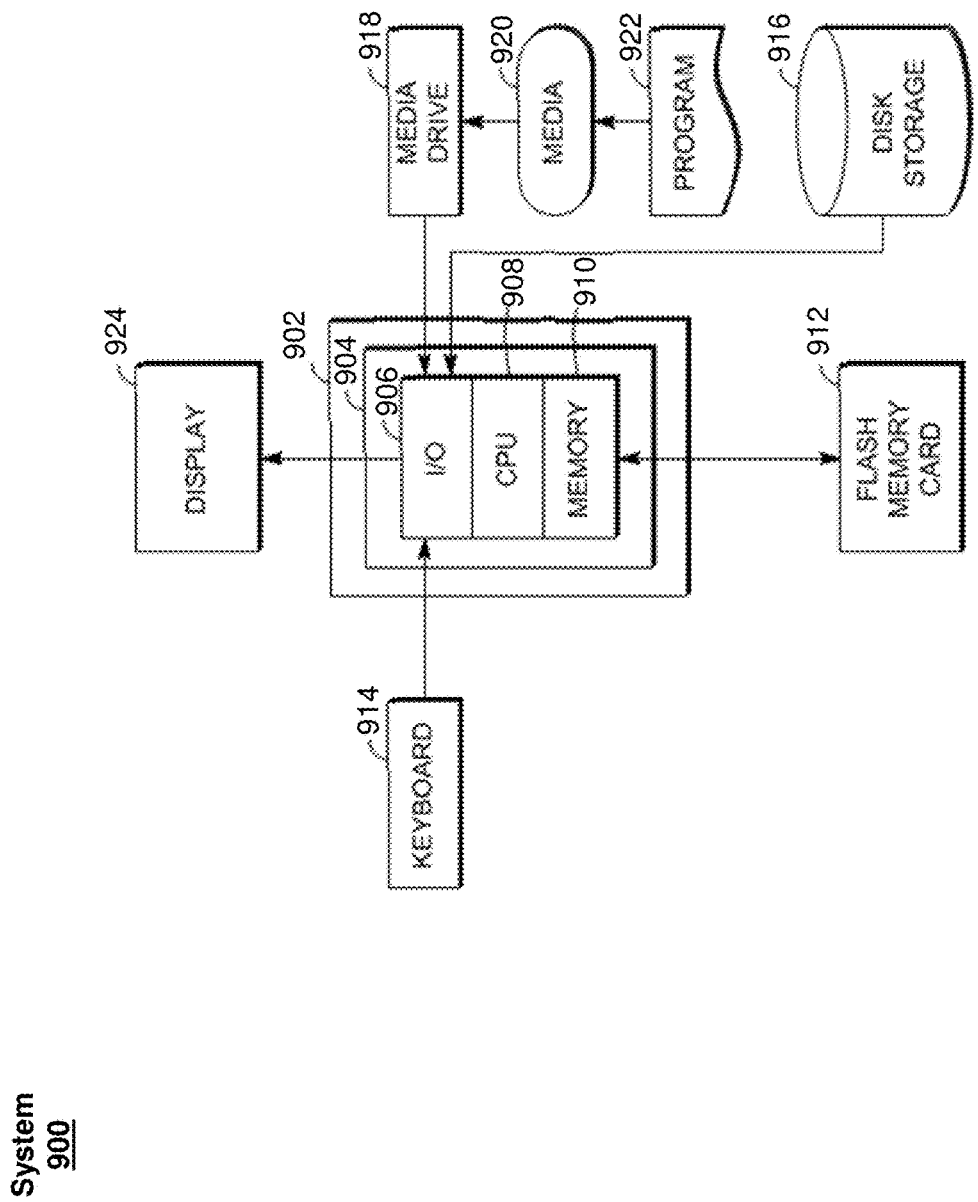
FIG. 9 illustrates an exemplary computing system.

FIG. 9 depicts an exemplary computing system 900 configured to perform any one of the above-described processes. In this context, computing system 900 may include, for example, a processor, memory, storage, and input/output devices (e.g., monitor, keyboard, disk drive, Internet connection, etc.). However, computing system 900 may include circuitry or other specialized hardware for carrying out some or all aspects of the processes. In some operational settings, computing system 900 may be configured as a system that includes one or more units, each of which is configured to carry out some aspects of the processes either in software, hardware, or some combination thereof.

FIG. 9 depicts an exemplary computing system 900 with a number of components that may be used to perform the above-described processes. The main system 902 includes a motherboard 904 having an input/output ("I/O") section 906, one or more central processing units ("CPU") 908, and a memory section 910, which may have a flash memory card 912 related to it. The I/O section 906 is connected to a display 924, a keyboard 914, a disk storage unit 916, and a media drive unit 918. The media drive unit 918 can read/write a computer-readable medium 920, which can contain programs 922 or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general purpose programming language (e.g., Pascal, C, C++) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this disclosure.

What is claimed is:

1. A computer-implemented method for managing computer generated imagery (CGI) animation files in a computer network, the method comprising:
   receiving a request for a file system object from a requester, wherein the file system object provides an interface between the requester and one or more hardware resources for processing animation files and completing file system tasks, and wherein the request is made by a program at the requester;
   determining file system object requirements based on the request and the type of program that made the request, wherein:
      the file system object requirements are determined to be a first set of requirements when the program that made the request is an animation program, and
      the file system object requirements are determined to be a set of requirements different than the first set of requirements when the program that made the request is not an animation program;

determining one or more hardware resource mappings based on the file system object requirements, wherein the one or more hardware resource mappings identify one or more hardware resources for the requester for processing animation files and completing file system tasks, and wherein the one or more hardware resources identified by the one or more hardware resource mappings satisfy the file system object requirements;

providing to the requester at least one of the one or more hardware resource mappings; and receiving a file system task request from an instantiated file system object, wherein the file system object was instantiated at the requester using the at least one hardware resource mappings.

2. The computer-implemented method of claim 1, wherein the request for a file system object comprises a location.

3. The computer-implemented method of claim 1, wherein the request for a file system object comprises one or more of storage type, transfer speed, write speed, read speed, versioning policy, capacity, permanence, and quality.

4. The computer-implemented method of claim 1, further comprising:
determining one or more hardware resource requirements based on the request, wherein the one or more hardware resources identified by the one or more hardware resource mappings satisfy the one or more hardware resource requirements.

5. The computer-implemented method of claim 4, wherein the hardware resource requirements comprise one or more of location, storage type, transfer speed, write speed, read speed, capacity, permanence, and quality.

6. The computer-implemented method of claim 4, further comprising:
allocating the identified one or more hardware resources for the requester to use for processing animation files and completing file system tasks,
wherein the one or more allocated hardware resources are identified in the instantiated file system object.

7. The computer-implemented method of claim 1, wherein providing to the requester at least one of the one or more hardware resource mappings comprises:
providing one or more of a link, handle, mount point, hardware address, or Internet protocol address for accessing the identified one or more hardware resources.

8. The computer-implemented method of claim 1, wherein the instantiated file system object comprises:
a script for communicating file system task requests from the requester to the identified one or more hardware resources.

9. The computer-implemented method of claim 8, wherein the identified one or more hardware resources operate on a file system different than a file system of the requester.

10. The computer-implemented method of claim 1, wherein the instantiated file system object comprises a caching module, wherein the caching module is configured to cause file delivery to be accelerated from a network storage device to the identified one or more hardware resources.

11. The computer-implemented method of claim 1, wherein the instantiated file system object comprises a tracking module, wherein the tracking module is configured to cause files to be located and to cause file access to be provided.

12. The computer-implemented method of claim 1, wherein the instantiated file system object, in response to a request to create a file, is configured to:
cause a uniform resource identifier to be generated for the file;
cause memory to be allocated for the file;
cause the uniform resource identifier to be mapped to the allocated memory; and
cause a file handle corresponding to the file to be provided.

13. The computer-implemented method of claim 1, wherein the instantiated file system object, in response to a request to retrieve a file, is configured to:
cause memory to be allocated for a copy of the file;
cause the requested file to be copied to the allocated memory; and
cause a link to the copied file to be provided.

14. The computer-implemented method of claim 13, wherein the instantiated file system object is further configured to:
cause a uniform resource identifier for the copy of the file to be generated; and
cause the uniform resource identifier to be mapped to the allocated memory.

15. A non-transitory computer-readable storage medium comprising computer-executable instructions for computer generated imagery (CGI) animation files in a computer network, the computer-executable instructions comprising instructions for:
receiving a request for a file system object from a requester, wherein the file system object provides an interface between the requester and one or more hardware resources for processing animation files and for completing file system tasks, and wherein the request is made by a program at the requester;
determining file system object requirements based on the request and the type of program that made the request, wherein:
the file system object requirements are determined to be a first set of requirements when the program that made the request is an animation program, and
the file system object requirements are determined to be a set of requirements different than the first set of requirements when the program that made the request is not an animation program;
determining one or more hardware resource mappings based on the file system object requirements, wherein the one or more hardware resource mappings identify one or more hardware resources for the requester for processing animation files and for completing file system tasks, and wherein the one or more hardware resources identified by the one or more hardware resource mappings satisfy the file system object requirements;
providing to the requester at least one of the one or more hardware resource mappings; and
receiving a file system task request from an instantiated file system object, wherein the file system object was instantiated at the requester using the at least one hardware resource mappings.

16. The computer-readable storage medium of claim 15, wherein the computer-executable instructions further comprise instructions for:
allocating the identified one or more hardware resources for the requester to use for processing animation files and for completing file system tasks, wherein the one or more allocated hardware resources are identified in the instantiated file system object.

17. The computer-readable storage medium of claim 15, wherein the instantiated file system object, in response to a request to create a file, is configured to:
   cause a uniform resource identifier to be generated for the file;
   cause memory to be allocated for the file;
   cause the uniform resource identifier to be mapped to the allocated memory; and
   cause a file handle corresponding to the file to be provided.

18. The computer-readable storage medium of claim 15, wherein the instantiated file system object, in response to a request to retrieve a file, is configured to:
   cause memory to be allocated for a copy of the file;
   cause the requested file to be copied to the allocated memory; and
   cause a link to the copied file to be provided.

19. The computer-readable storage medium of claim 18, wherein the instantiated file system object is further configured to:
   cause a uniform resource identifier to be generated for the copy of the file; and
   cause the uniform resource identifier to be mapped to the allocated memory.

20. A system for managing computer generated imagery (CGI) animation files in a computer network, the system comprising:
   a memory configured to store data; and
   a computer processor configured to:
      receive a request for a file system object from a requester, wherein the file system object provides an interface between the requester and one or more hardware resources for processing animation files and for completing file system tasks, and wherein the request is made by a program at the requester;
      determine file system object requirements based on the request and the type of program that made the request, wherein:
         the file system object requirements are determined to be a first set of requirements when the program that made the request is an animation program, and
         the file system object requirements are determined to be a set of requirements different than the first set of requirements when the program that made the request is not an animation program;
      determine one or more hardware resource mappings based on the file system object requirements, wherein the one or more hardware resource mappings identify one or more hardware resources for the requester for processing animation files and for completing file system tasks, and wherein the one or more hardware resources identified by the one or more hardware resource mappings satisfy the file system object requirements;
      provide to the requester at least one of the one or more hardware resource mappings; and
      receive a file system task request from an instantiated file system object, wherein the file system object was instantiated at the requester using the at least one hardware resource mappings.

21. The system of claim 20, wherein the computer processor is further configured to:
   allocate the identified one or more hardware resources for the requester to use for processing animation files and for completing file system tasks,
   wherein the one or more allocated hardware resources are identified in the instantiated file system object.

22. The system of claim 20, wherein the instantiated file system object, in response to a request to create a file, is configured to:
   cause a uniform resource identifier to be generated for the file;
   cause memory to be allocated for the file;
   cause the uniform resource identifier to be mapped to the allocated memory; and
   cause a file handle corresponding to the file to be provided.

23. The system of claim 20, wherein the instantiated file system object, in response to a request to retrieve a file, is configured to:
   cause memory to be allocated for a copy of the file;
   cause the requested file to be copied to the allocated memory; and
   cause a link to the copied file to be provided.

24. The system of claim 23, wherein the instantiated file system object is further configured to:
   cause a uniform resource identifier to be generated for the copy of the file; and
   cause the uniform resource identifier to be mapped to the allocated memory.

25. The computer-implemented method of claim 1, wherein receiving the file system task request from the instantiated file system object comprises:
   receiving the file system task request at a hardware resource of the one or more hardware resources, wherein the file system task request is addressed to the hardware resource by the requester.

26. The computer-readable storage medium of claim 15, wherein receiving the file system task request from the instantiated file system object comprises:
   receiving the file system task request at a hardware resource of the one or more hardware resources, wherein the file system task request is addressed to the hardware resource by the requester.

27. The system of claim 20, wherein receiving the file system task request from the instantiated file system object comprises:
   receiving the file system task request at a hardware resource of the one or more hardware resources, wherein the file system task request is addressed to the hardware resource by the requester.

\* \* \* \* \*